Patented Aug. 29, 1933

1,924,214

UNITED STATES PATENT OFFICE 1,924,214

METHOD OF MAKING ARTICLES FROM RUBBER DISPERSIONS

Edwin B. Newton, Akron, Ohio, assignor to American Anode, Inc., Akron, Ohio, a Corporation of Delaware No Drawing. Application December 30, 1931
Serial No. 583,915

13 Claims. (Cl. 18—58)

This invention relates to the art of making articles directly from liquid dispersions of rubber, and particularly to the making of articles on a solid or impervious mold or form by the application thereto of one or more coatings of aqueous rubber dispersions.

In the practice of this art, it has been customary to form the articles on a solid mold of the desired shape by coating the mold with the liquid dispersion, drying the coating and subsequently vulcanizing it. The coating may be applied to the mold in any desired manner, as by dipping the mold into a liquid dispersion of rubber and withdrawing it with an adherent coating, or alternatively, by first associating with the mold a coagulating or setting medium and then dipping into, or spraying or spreading the treated mold with, the liquid rubber dispersion, building up a layer of coagulated rubber on the mold, and withdrawing the form with its built-up layer thereon. The deposited coating constituting the rubber article, after drying, is in any case either vulcanized on the mold and subsequently stripped therefrom, or is stripped from the mold before vulcanization is effected.

In the practice of these prior methods of manufacture, defective articles have frequently been produced because of the tendency during manufacture for air and generated vapors to become entrapped between the mold and the coating of the dispersion, thus forming a bubble or vapor pocket which causes a defect in or a blemish on the surface of the finished article. Further, the presence of the slightest amount of grease or of certain other foreign materials on the surface of the mold normally results in somewhat similar defects in the product, which has necessitated keeping the mold scrupulously clean and made imperative the careful cleaning of the mold each time it was used. Further, considerable difficulty has been experienced in stripping the formed articles from the mold because of adhesion of the rubber to the mold.

The chief objects of this invention therefore, are to improve the quality and to reduce the number of defectives, to eliminate the necessity of carefully cleaning impervious molds, such as metal, porcelain and glass molds, before each cycle of operation with its attendant expense and inconvenience, and to facilitate the removal from the molds of articles formed directly from rubber dispersions by deposition of rubber therefrom on the molds.

In carrying out the invention, the mold on which deposition is to occur is coated, prior to placing it in contact with the dispersion from which the rubber is to be deposited, with a material which will act as a separating and venting layer between the deposited rubber and the mold thus preventing adherence between the rubber and the mold and forming a vapor-pervious layer into and through which air and entrapped vapors may escape, and also effectively covering any adhering foreign materials there may be on the surface of the mold, and which otherwise would cause non-uniform building up of the rubber on the mold from the aqueous dispersion.

The invention in a preferred embodiment comprises preparing the mold on which the rubber is subsequently to be deposited from an aqueous dispersion thereof by applying to the surface of the mold a coating of a liquid mixture comprising a substantially water-insoluble, finely divided material suspended in any suitable liquid vehicle, and then drying the adhering suspension sufficiently to form a non-flowing film or thin venting and separating layer of finely divided material on the surface of the mold.

It has been found that the most satisfactory finely divided materials for use in forming the separating and venting layer are those whose particles are essentially plate-like or needle-like in form. Examples of such satisfactory materials are: mica, graphite, diatomaceous earths such as fossil flour and slate flour, soapstone, magnesium carbonate and the like.

These finely divided materials are preferably suspended in a volatile vehicle such as an alcohol or a ketone so that the time required to evaporate the vehicle from the film of the suspension to form a non-flowing layer may be as short as possible, although less volatile liquids may be used.

The mold treated as above described may be employed for the formation thereon of an article from an aqueous dispersion of rubber, as by dipping the mold in the rubber dispersion, removing the mold with an adherent coating of the dispersion, and drying the coating, which process may be repeated as many times as may be desired to secure the required thickness to the article.

For securing heavier coatings, or articles of greater thickness by a single application of the liquid rubber dispersion, as by one immersion in the dispersion, a coating of suitable rubber coagulant may be applied in any convenient manner, as by dipping or spraying on to the mold treated as above described, followed by the application of a suitable aqueous rubber dispersion, whereupon a layer of rubber will be coagulated from the dispersion on the surface of the mold by reason of the diffusion of coagulating ions from the surface coating of coagulant previously applied to the mold.

Any of the commonly used rubber latex coagulants such as formic, acetic, sulfuric and other acids, or the salts of calcium, magnesium and zinc, such as the nitrates, chlorides, etc., or dehydrants such as alcohol, acetone and similar materials, may be used in this process.

The freshly formed rubber article made by either of the above described methods, when dried at least in part, may be vulcanized on the mold in any suitable manner, preferably by the application of heat, or the article may be removed from the mold after drying or partial drying and then vulcanized.

The presence of the layer of finely divided material between the mold and the rubber layer serves two important functions during the drying and vulcanizing operations: first, it prevents the rubber from sticking to the mold which is a common defect in prior processes resulting both because of the shrinkage of the rubber layer during drying and the consequent gripping of the mold, and because upon heating, the rubber first becomes soft and sticky, and these two effects namely, the interfacial pressure and adhesion of the rubber, tend to bond the rubber to the mold; and second, it forms a gas- and vapor-pervious stratum into and through which air and vapors trapped or formed between the rubber layer and the mold may during drying and vulcanization readily escape, thus eliminating blemishes and pits which otherwise would be impressed on the surface of the rubber article contiguous to the mold by reason of localized globules or masses of entrapped air or vapors.

An alternative procedure comprises applying to the mold on which the article is to be made, a coating of a suspension containing both a suitable rubber coagulant and a substantially water-insoluble, finely divided material, then drying the adhering fluid film sufficiently to render it non-flowing and to form a layer on the surface of the mold containing the rubber coagulant associated with the separating material forming the venting stratum. A coating of the desired rubber dispersion then may be applied to the prepared mold, and the coagulated rubber dried and vulcanized as hereinbefore described. In the manufacture of certain articles it may be desirable to apply the coagulant and finely divided material to the mold simultaneously as above described, and to follow this treatment with an application of a second layer or coating containing a rubber coagulant.

Typical examples of satisfactory compositions of the suspensions employed in the process are hereinbelow given for the purpose of illustration and are not intended to limit the invention, it being obvious that suspensions comprising other materials in widely varying concentrations may be employed without departing from the spirit of the invention.

*Example I*

| Finely divided soapstone | 200 grams |
| Methanol | 1000 c. c. |

*Example II*

| Fossil flour | 100 grams |
| Calcium nitrate crystals | 400 grams |
| Acetone to make | 1000 c. c. |

The practice of this invention in manufacturing articles directly from rubber dispersions improves the quality of the articles produced, materially reduces the number of defectives, and increases appreciably the rate of production and by providing a venting stratum between the rubber articles and the mold into which any air or generated vapors entrapped therebetween may diffuse and escape, the formation or production of blemishes and pits in the surface of the finished article due to the presence of such entrapped air or vapors is prevented.

The coating of finely divided material also effectively surrounds and covers any undesirable or closely adherent foreign material, such as grease spots, which may be present on the surface of the mold and which would otherwise cause impairment of the quality of the finished product. Consequently, the necessity of frequent, regular, and thorough cleaning of the mold is obviated, a factor of considerable importance in mass production operations where large numbers of molds are employed.

Further, because the layer of separating material between the rubber article and the mold effectively prevents adherence of the rubber to the mold, the finished article may be readily and easily stripped therefrom without the difficulty attending removing articles from molds not treated as herein described, and without injury to the articles by reason of undue forces applied thereto to effect the removal from the form.

In brief, the improved process of this invention results in the production of a higher percentage of perfect articles than is possible with prior methods of manufacture, and consequently marked savings in both time and expense are effected.

The term "rubber" is employed in the specification and claims in a generic sense to include caoutchouc, balata, gutta percha, and like gums, in an unvulcanized, vulcanized or reclaimed condition, as well as synthetic rubbers, rubber substitutes and the like. The term "liquid dispersions of rubber" includes flowable liquids made by dispersing rubber as hereinabove defined in liquid vehicles either with or without the aid of dispersing and/or stabilizing agents, as well as latices of caoutchouc, balata, gutta percha and the like, either in a natural condition or modified by dilution, concentration and/or by the addition of thickening, thinning or other modifying materials. The liquid dispersions of rubber should preferably contain compounding and vulcanizing agents, accelerators, age-resisters and other ingredients commonly employed in the rubber compositions from which commercial rubber articles are made.

While various embodiments of my invention have been hereinabove indicated, it will be understood that the invention of this application is not limited to the specific examples herein recited but that numerous modifications and variations thereof may be made without departing from the principles of my invention as defined in the appended claims.

I claim:

1. In the method of forming rubber articles from a liquid dispersion of rubber by deposition of rubber therefrom directly upon the surface of an impervious mold, the process which comprises the step performed prior to the deposition of the rubber on the mold consisting in applying to the surface of the mold a gas-pervious venting stratum of water-insoluble non-fibrous material capable of separating the layer of deposited rubber from the mold.

2. In the method of forming rubber articles from a liquid dispersion of rubber by deposition of rubber therefrom directly upon the surface of an impervious mold, the process which comprises applying to the surface of the mold a separating and venting stratum containing a substantially water-insoluble finely divided material.

3. In the method of forming rubber articles from an aqueous dispersion of rubber by deposition of rubber therefrom directly upon the surface of an impervious mold, the process which comprises applying to the surface of the mold a coating of a liquid suspension containing a substantially water-insoluble finely divided material in a volatile liquid vehicle, and removing at least in part the liquid vehicle to form a non-flowing stratum on the surface of the mold.

4. In the method of forming rubber articles from an aqueous dispersion of rubber by deposition of rubber therefrom directly upon the surface of an impervious mold, the process which comprises applying to the surface of the mold a separating and venting stratum containing a substantially water-insoluble finely divided material, the particles of which are essentially plate-like in form.

5. In the method of forming rubber articles from an aqueous dispersion of rubber by deposition of rubber therefrom directly upon the surface of an impervious mold, the process which comprises applying to the surface of the mold a separating and venting stratum containing a substantially water-insoluble inorganic material, the particles of which are essentially plate-like in form.

6. In the method of forming rubber articles from an aqueous dispersion of rubber by deposition of rubber therefrom directly upon the surface of an impervious mold, the process which comprises applying to the surface of the mold a separating and venting stratum containing diatomaceous earth.

7. In the method of forming rubber articles from an aqueous dispersion of rubber by deposition of rubber therefrom directly upon the surface of an impervious mold, the process which comprises applying to the surface of the mold a separating and venting stratum containing mica.

8. In the method of forming rubber articles from an aqueous dispersion of rubber by deposition of rubber therefrom directly upon the surface of an impervious mold, the process which comprises applying to the surface of the mold a separating and venting stratum containing soapstone.

9. In the method of forming rubber articles from an aqueous dispersion of rubber by deposition of rubber therefrom directly upon the surface of an impervious mold, the process which comprises applying to the surface of the mold a separating and venting stratum containing a rubber latex coagulant and a substantially water-insoluble finely divided material.

10. In the method of forming rubber articles from an aqueous dispersion of rubber by deposition of rubber therefrom directly upon the surface of an impervious mold, the process which comprises applying to the surface of the mold a liquid vehicle containing a rubber latex coagulant, and suspended therein a substantially water-insoluble finely divided material and removing at least in part the liquid vehicle to form a non-flowing separating and venting stratum containing the rubber latex coagulant associated with the finely divided material on the surface of the mold.

11. In the method of forming rubber articles from an aqueous dispersion of rubber by deposition of rubber therefrom directly upon the surface of an impervious mold, the process which comprises applying to the surface of the mold a separating and venting stratum containing a substantially water-insoluble finely divided material and superimposing on said stratum a coating containing a rubber coagulant.

12. In the method of forming rubber articles from an aqueous dispersion of rubber by deposition of rubber therefrom directly upon the surface of an impervious mold, the process which comprises applying to the surface of the mold a separating and venting stratum containing a rubber latex coagulant and substantially water-insoluble finely divided material and superimposing on said stratum a coating containing a rubber coagulant.

13. A process which comprises coating a form with a thin gas-pervious film of a composition comprising a coagulant and a water-insoluble material, and associating the coated form with a coagulable dispersion of rubber.

EDWIN B. NEWTON.